US012681989B2

(12) United States Patent
Maya

(10) Patent No.: US 12,681,989 B2
(45) Date of Patent: Jul. 14, 2026

(54) INFORMATION PROCESSING APPARATUS, INFORMATION PROCESSING METHOD, AND INFORMATION PROCESSING COMPUTER PROGRAM PRODUCT

(71) Applicant: KABUSHIKI KAISHA TOSHIBA, Tokyo (JP)

(72) Inventor: Shigeru Maya, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 125 days.

(21) Appl. No.: 18/673,530

(22) Filed: May 24, 2024

(65) Prior Publication Data

US 2025/0077579 A1    Mar. 6, 2025

(30) Foreign Application Priority Data

Aug. 28, 2023    (JP) ................................. 2023-137809

(51) Int. Cl.
*G06F 16/90* (2019.01)
*G06F 16/28* (2019.01)
(Continued)

(52) U.S. Cl.
CPC ........ *G06F 16/9024* (2019.01); *G06F 16/285* (2019.01); *G06Q 30/0631* (2013.01)

(58) Field of Classification Search
CPC .............. G06F 16/9024; G06F 16/285; G06Q 30/0631
See application file for complete search history.

(56) References Cited

U.S. PATENT DOCUMENTS 6,317,722 B1 * 11/2001 Jacobi ................ G06Q 30/0277
                                                    707/999.102
8,473,369 B2 * 6/2013 Bradley ................. G06Q 30/06
                                                    705/26.7

(Continued)

FOREIGN PATENT DOCUMENTS

JP      2003-99643 A     4/2003
JP      2016-61740 A     4/2016
(Continued)

OTHER PUBLICATIONS

* DBpedia, "Using DBpedia Categories to Evaluate and Explain Similarity in Linked Open Data", Houcine Senoussi Quartz Laboratory, EISTI, Cergy, France, published Apr. 28, 2017, pp. 117-127. (Year: 2017).*

(Continued)

*Primary Examiner* — Hicham Skhoun
(74) *Attorney, Agent, or Firm* — Finnegan, Henderson, Farabow, Garrett & Dunner, LLP

(57)                    ABSTRACT

An information processing apparatus 10 includes a processing unit 20. The processing unit 20 calculates, for each pair of pieces of data defined in a graph representing relational data 16A indicating a relationship between a plurality of pieces of data in a graph structure, a degree of relevance between a target category to be analyzed and another category other than the target category on the basis of a score calculated according to a degree of relationship between a pair of pieces of data constituting the pair and an evaluation index for evaluating the degree of relevance between the categories.

20 Claims, 10 Drawing Sheets

(51) Int. Cl.
  *G06F 16/901*     (2019.01)
  *G06Q 30/0601*    (2023.01)

(56)         References Cited

U.S. PATENT DOCUMENTS

| | | | |
|---|---|---|---|
| 9,552,603 B1 * | 1/2017 | Chanda | G06Q 30/0631 |
| 10,748,159 B1 * | 8/2020 | Selinger | G06Q 30/02 |
| 10,796,321 B1 * | 10/2020 | Balakrishnan | G06Q 30/0631 |
| 11,037,071 B1 * | 6/2021 | Tekiela | G06V 10/764 |
| 11,055,316 B2 * | 7/2021 | Pinno | G06F 16/283 |
| 11,250,488 B1 * | 2/2022 | Rao | G06N 3/088 |
| 11,676,193 B1 * | 6/2023 | VisentiniScarzanella | G06Q 30/0631 705/26.7 |
| 2008/0177731 A1 * | 7/2008 | Matsuzaki | G06F 16/353 707/999.005 |
| 2009/0055257 A1 * | 2/2009 | Chien | G06Q 30/02 705/14.69 |
| 2016/0084938 A1 | 3/2016 | Doi et al. | |
| 2017/0235824 A1 * | 8/2017 | Liu | G06F 40/00 707/723 |
| 2018/0047035 A1 * | 2/2018 | Yoshida | G06Q 30/0201 |
| 2018/0260829 A1 | 9/2018 | Nakadai et al. | |
| 2019/0286657 A1 * | 9/2019 | Li | G06F 16/90328 |
| 2021/0194907 A1 * | 6/2021 | Bertiger | H04L 43/0811 |
| 2022/0207587 A1 * | 6/2022 | Yang | G06N 3/08 |
| 2022/0261873 A1 * | 8/2022 | Xu | G06N 5/04 |
| 2024/0061859 A1 * | 2/2024 | Ebihara | G06F 16/632 |
| 2024/0095286 A1 * | 3/2024 | Oyamada | G06F 16/906 |
| 2024/0104408 A1 * | 3/2024 | Schroeter | G06N 5/022 |
| 2024/0265029 A1 * | 8/2024 | Kusano | G06F 16/258 |
| 2025/0013700 A1 * | 1/2025 | Guan | G06F 16/9538 |

FOREIGN PATENT DOCUMENTS

| | | | |
|---|---|---|---|
| JP | 2016-136410 A | | 7/2016 |
| JP | 6175037 B2 | | 8/2017 |
| JP | 2017-174357 A | | 9/2017 |
| JP | 6662298 B2 | | 3/2020 |
| JP | 6840446 B2 | | 3/2021 |
| WO | WO 2016/139939 A1 | | 9/2016 |

OTHER PUBLICATIONS

• Macro, "A novel way of computing similarities between nodes of a graph, with application to collaborative recommendation", Francois Fouss, Alain Pirotte & Marco Saerens, published 2005, pp. 1-7. (Year: 2005).*

Ä¢ DBpedia, âUsing DBpedia Categories to Evaluate and Explain Similarity in Linked Open Dataâ, Houcine Senoussi Quartz Laboratory, EISTI, Cergy, France, published Apr. 28, 2017, pp. 117-127. (Year: 2017).*

Ä¢ Macro, âA novel way of computing similarities between nodes of a graph, with application to collaborative recommendationâ, Francois Fouss, Alain Pirotte & Marco Saerens, published 2005, pp. 1-7. (Year: 2005).*

Japan Patent Office, Office Action in JP App. No. 2023-137809 (Mar. 3, 2026).

Takayasu Hondo et al., "Products, a brand, a sales floor is thinned with the purchasing data with customer ID," Chapter 2, pp. 1-29, Eiji Press (2015).

Tsuyoshi Murata, "Web Structure Mining and Web Community Discovery," Ipsj Sig Tech. Reports, vol. 2006, No. 59, pp. 85-90 (2026).

Jaeyoung Jung et al., "The appropriate cluster of the semantic network using the potentiality adjacency about becoming," Proc. of 13th Annual Meeting of Assoc. for Natural Language Processing, pp. 246-249 (2007).

* cited by examiner

| USER | PRODUCT | SCORE |
|---|---|---|
| USER A | PRODUCT a | 14 |
| USER A | PRODUCT b | 23 |
| USER B | PRODUCT a | 32 |
| USER B | PRODUCT b | 19 |

| ANOTHER CATEGORY | DEGREE OF RELEVANCE WITH RESPECT TO TARGET CATEGORY "SOFT DRINK" |
|---|---|
| CATEGORY: TEA | 4.5 |
| CATEGORY: LUNCH BOX | 2.3 |
| CATEGORY: SNACK | 1.2 |

START

ACQUIRE RELATIONAL DATA — S100

GENERATE GRAPH — S102

CALCULATE SCORE — S104

REGISTER IN SCORE DB — S106

CALCULATE DEGREE OF RELEVANCE — S108

GENERATE TARGET GRAPH — S110

CALCULATE REPRESENTATION VECTOR — S112

EXTRACT TENDENCY PATTERN — S114

CONTROL OUTPUT — S116

END

| RANKING | PRODUCT IN WHICH USER A IS INTERESTED |
|---------|---------------------------------------|
| 1       | PRODUCT a                             |
| 2       | PRODUCT b                             |
| 3       | PRODUCT c                             |

| PRODUCT OF FRESH VEGETABLE | DEGREE OF RELEVANCE WHEN CALCULATED ONLY BY FRESH VEGETABLE | DEGREE OF RELEVANCE WHEN CALCULATED BY FRESH VEGETABLE AND (MEAT/EGG) | IMPROVE-MENT RATIO | PRODUCT HAVING MAXIMUM NUMBER OF PATHS IN (MEAT/EGG) CATEGORY |
|----------------------------|-----------|-----------|--------|-----------|
| TOMATO    | 0.78 | 0.97 | +0.21 | EGG       |
| CUCUMBER  | 0.69 | 0.87 | +0.18 | SAUSAGE   |
| ASPARAGUS | 0.60 | 0.75 | +0.15 | QUAIL EGG |

```
     ┌─81              ┌─82              ┌─83
┌──────────┐     ┌──────────┐     ┌──────────┐
│   CPU    │     │   ROM    │     │   RAM    │
└──────────┘     └──────────┘     └──────────┘
     ↕                ↕                ↕
                                            ┌─85
─────────────────────────────────────────────────
            ↕
       ┌─84
┌──────────────────────┐
│   COMMUNICATION I/F   │
└──────────────────────┘
```

INFORMATION PROCESSING APPARATUS, INFORMATION PROCESSING METHOD, AND INFORMATION PROCESSING COMPUTER PROGRAM PRODUCT

CROSS-REFERENCE TO RELATED APPLICATIONS

This application is based upon and claims the benefit of priority from Japanese Patent Application No. 2023-137809, filed on Aug. 28, 2023; the entire contents of which are incorporated herein by reference.

FIELD

Embodiments described herein relate generally to an information processing apparatus, an information processing method, and an information processing computer program product.

BACKGROUND

In recent years, with the progress of the Internet of Things (IoT), utilization of relational data indicating a relationship between pieces of data is accelerated. Examples of the relational data include purchase histories of each of a plurality of users and application data of job seeking activities for companies. As a technique for utilizing relational data, a technique is disclosed in which a degree of relevance between a target category to which certain data belongs and another category other than the target category is obtained by clustering or grouping a plurality of pieces of data included in the relational data. As the clustering or grouping, a technique of performing clustering from purchase data using non-negative matrix decomposition, a technique of defining a unique index on the basis of a purchase trend and grouping data, and the like are disclosed.

However, in the conventional technique, in a case where the number of pieces of data belonging to the target category is small in all data, it may be difficult to extract another category having a high degree of relevance with respect to the target category. In addition, in the conventional technique, in a case where the feature of the evaluation index is not considered at the time of extraction of another category related to the target category, there are cases of decreased calculation accuracy of the degree of relevance. That is, in the conventional technique, it may be difficult to provide the degree of relevance between the target category and another category with high accuracy.

BRIEF DESCRIPTION OF THE DRAWINGS

FIG. 5 is a schematic diagram of a data configuration of a score DB;

FIG. 6 is a schematic diagram of an output result of a degree of relevance;

FIG. 13 is a schematic diagram of output information including recommendation data;

FIG. 14 is a schematic diagram of output information;

FIG. 16 is a hardware configuration diagram of the information processing apparatus.

DETAILED DESCRIPTION

An object of the present disclosure is to provide an information processing apparatus, an information processing method, and an information processing computer program product capable of providing a degree of relevance between a target category and another category with high accuracy.

According to an embodiment, an information processing apparatus includes a hardware processor configured to function as a processing unit. The processing unit is configured to calculate, for each pair of pieces of data defined in a graph representing relational data indicating a relationship between a plurality of pieces of data in a graph structure, a degree of relevance between a target category to be analyzed and another category other than the target category on a basis of a score calculated according to a degree of relationship between a pair of pieces of data constituting the pair and an evaluation index for evaluating the degree of relevance between categories. Hereinafter, embodiments of an information processing apparatus, an information processing method, and an information processing computer program product according to the present disclosure will be described with reference to the drawings.

First Embodiment

Figures 1, 2:
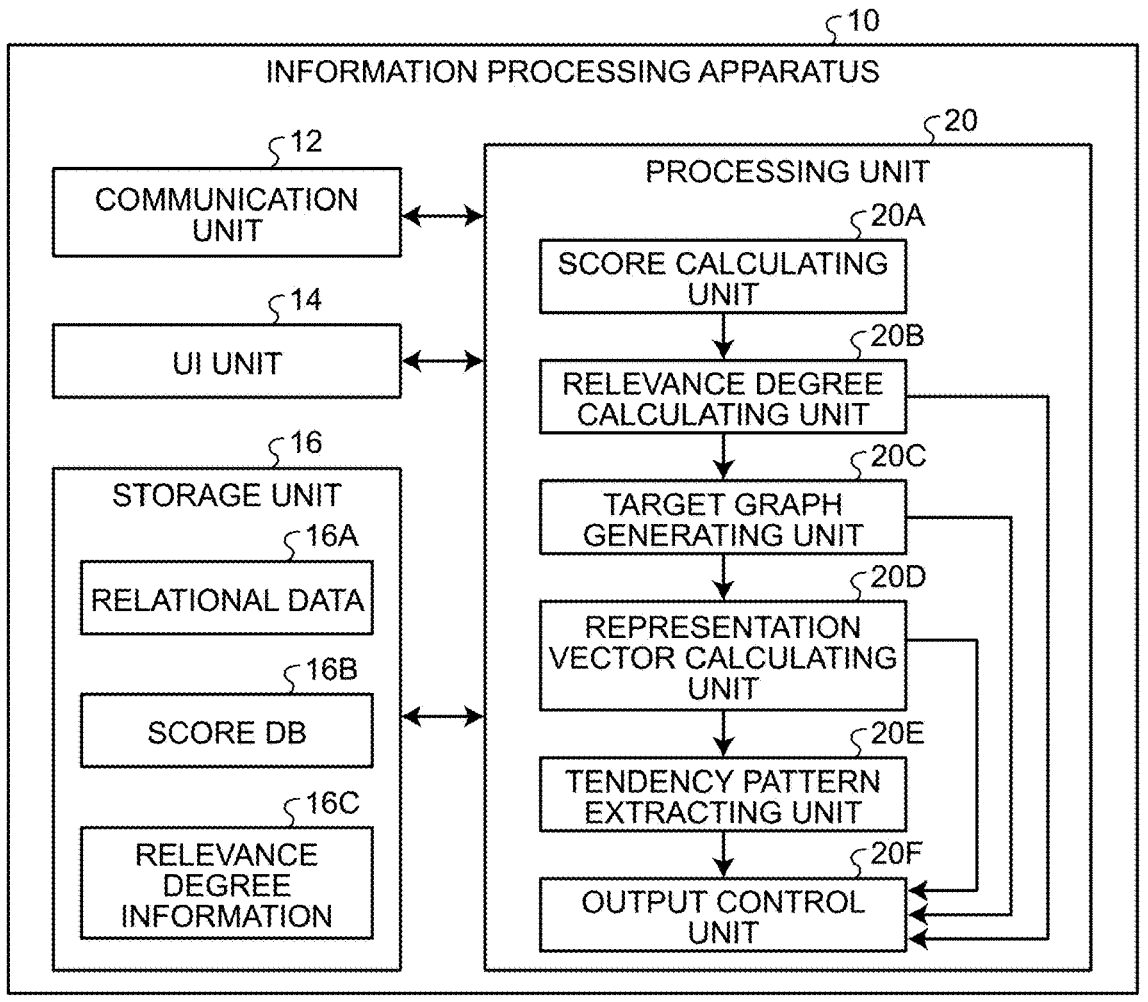
FIG. 1 is a diagram illustrating a functional configuration of an information processing apparatus.
FIG. 2 is a schematic diagram illustrating a data configuration of relational data.

FIG. 1 is a diagram illustrating an example of a functional configuration of an information processing apparatus 10 according to the present embodiment.

The information processing apparatus 10 is an information processing apparatus that provides a degree of relevance between a target category and other categories. Details of the target category and the other categories will be described later.

The information processing apparatus 10 includes a communication unit 12, a user interface (UI) unit 14, a storage unit 16, and a processing unit 20. The communication unit 12, the UI unit 14, the storage unit 16, and the processing unit 20 are communicably connected by a bus or the like.

The communication unit 12 communicates with an external information processing apparatus via a network or the like. The UI unit 14 has an input function of receiving an operation input by the user and an output function of outputting various types of information. The input function is, for example, an input device such as a keyboard. The output function is a display that displays various types of information, a speaker that outputs sound, or the like.

The storage unit 16 stores various types of information. In the present embodiment, the storage unit 16 stores relational data 16A, score DB 16B, relevance degree information 16C, and the like. Details of these pieces of data will be described later.

The processing unit 20 is an arithmetic unit that executes information processing. The processing unit 20 includes a score calculating unit 20A, a relevance degree calculating unit 20B, a target graph generating unit 20C, a representation vector calculating unit 20D, a tendency pattern extracting unit 20E, and an output control unit 20F.

At least one of the score calculating unit 20A, the relevance degree calculating unit 20B, the target graph generating unit 20C, the representation vector calculating unit 20D, the tendency pattern extracting unit 20E, and the output control unit 20F is implemented by, for example, one or a plurality of processors. For example, each of the above units may be implemented by causing a processor such as a CPU to execute a program, that is, by software. Each of the above units may be implemented by a processor such as a dedicated integrated circuit (IC), that is, hardware. Each of the above units may be implemented by using software and hardware in combination. In the case of using a plurality of processors, each processor may implement one of the respective units, or may implement two or more of the respective units.

Note that the processing unit 20 only needs to include at least the score calculating unit 20A and the relevance degree calculating unit 20B, and may not include at least one of the target graph generating unit 20C, the representation vector calculating unit 20D, the tendency pattern extracting unit 20E, and the output control unit 20F.

Furthermore, at least one of at least one of the functional units included in the processing unit 20 and at least a part of various types of information stored in the storage unit 16 may be mounted on an external information processing apparatus or the like communicably connected to the information processing apparatus 10.

The score calculating unit 20A calculates a score according to a degree of relationship between a pair of pieces of data constituting a pair for each pair of pieces of data defined in a graph representing the relational data in a graph structure.

First, the score calculating unit 20A acquires the relational data 16A. In the present embodiment, the score calculating unit 20A acquires the relational data 16A by reading the relational data 16A stored in the storage unit 16. Note that the score calculating unit 20A may acquire the relational data 16A from an external information processing apparatus or the like via the communication unit 12.

FIG. 2 is a schematic diagram illustrating an example of a data configuration of the relational data 16A.

The relational data 16A is data representing a relationship between a plurality of pieces of data. Various types of data that can be acquired by the information processing apparatus 10 and relationships between the pieces of data are registered in the relational data 16A.

The relational data 16A may be any data representing a relationship between a plurality of pieces of data, and the type of included data is not limited. Examples of the relational data 16A include purchase data indicating a relationship between the user and a product purchased by the user, document data indicating a relationship between a word and a document including the word, citation data indicating a citation relationship between a document and a document, application data indicating a relationship between the user and a company applied by the user, SNS data indicating a relationship between users associated with a social networking service (SNS), and the like. The use language of the data registered in the relational data 16A is not limited, and may be any of Japanese, English, and languages other than Japanese and English, for example.

In the data included in the relational data 16A, a category to which the data belongs is defined in advance (not illustrated).

The category is a category to which data belongs. Specifically, the category corresponds to a label of each group when a plurality of pieces of data are classified into a plurality of groups according to a predetermined rule. In the present embodiment, it is assumed that a category to which each piece of data belongs is defined in advance for each of the plurality of pieces of data. For example, in a case where the data represents a product, the category to which the data belongs is, for example, soft drink, dairy product, tea, lunch box, snack, and the like. Furthermore, for example, in a case where the data is a user, the category to which the data belongs is an occupation of the user, a company, an industry to which the company belongs, or the like. Note that the category is not limited thereto.

The processing unit 20 may generate the relational data 16A and store the relational data in the storage unit 16 in advance. For example, the processing unit 20 may acquire data belonging to each of a plurality of types of categories via a network or the like, generate relational data 16A such as purchase data, document data, citation data, and adoption application data by a known method, and store the relational data in the storage unit 16 in advance. Furthermore, the processing unit 20 may store the relational data 16A generated by an external information processing apparatus or the like in the storage unit 16 in advance.

Note that the relational data 16A may be preprocessed in advance. For example, it is assumed that the relational data 16A is document data indicating a relationship between a word and a document including the word. In this case, the processing unit 20 may extract only words whose appearance frequency in the document is the designated number of times or more and register the extracted words in the relational data 16A. In addition, it is assumed that the relational data 16A is purchase data. In this case, the processing unit 20 may generate the relational data 16A in which only a product whose number of times of purchase by the user is the designated number of times or more is selectively associated with the user. In addition, it is assumed that the relational data 16A is citation data. In this case, the processing unit 20 may generate the relational data 16A selectively using only the specified citation relationship of the data for the past several years.

In the present embodiment, a mode in which the relational data 16A is purchase data indicating a relationship between the user and a product purchased by the user will be described as an example. In the present embodiment, a mode in which the category is a category to which a product such as soft drink, dairy product, tea, lunch box, or snack belongs will be described as an example. That is, in the present embodiment, it is assumed that a relationship between a product belonging to each of a plurality of types of categories and a user is registered in the relational data 16A in advance.

The data format of the relational data 16A is not limited. For example, the data format of the relational data 16A may be either a database format or a graph format.

In the case of the database format, the relational data 16A is, for example, a database in which the user and the product purchased by the user are associated with each other. This means that the user and the product associated in the relational data 16A in the database format have a relationship with each other.

In the case of the graph format, the relational data 16A is represented by, for example, a bipartite graph including two types of vertices of the user and the product. FIG. 2 illustrates the relational data 16A in a graph format as an example. This means that the user and the product associated by being linked in the relational data 16A in the graph format have a relationship with each other.

Returning to FIG. 1, the description will be continued. Next, the score calculating unit 20A generates a graph representing the relational data 16A in a graph structure.

Specifically, the score calculating unit 20A generates a graph for each pair of the target category and the other (another) category on a one-to-one basis from the relational data 16A.

The target category is a category to which specific data belongs. Specifically, the target category is a category to which the data to be analyzed belongs, which is necessary for the analysis scenario of the analyst. The other category represents another category other than the target category.

For example, it is assumed that the analyst desires to provide a degree of relevance between data belonging to a specific category and data belonging to another category among pieces of data of a plurality of types of categories included in the relational data 16A. Specifically, there is a case where an analyst desires to analyze which product in another category is highly relevant to a product in a specific category to be analyzed, such as soft drink. In this case, the analyst operates the UI unit 14 to input a desired specific category as the target category to be analyzed.

The score calculating unit 20A acquires the target category by receiving a specific category input by an operation instruction of the UI unit 14 by the analyst as the target category. Furthermore, the score calculating unit 20A may acquire the target category by reading the target category stored in advance in the storage unit 16. Furthermore, the score calculating unit 20A may acquire the target category from an external information processing apparatus via the communication unit 12.

Figure 3:
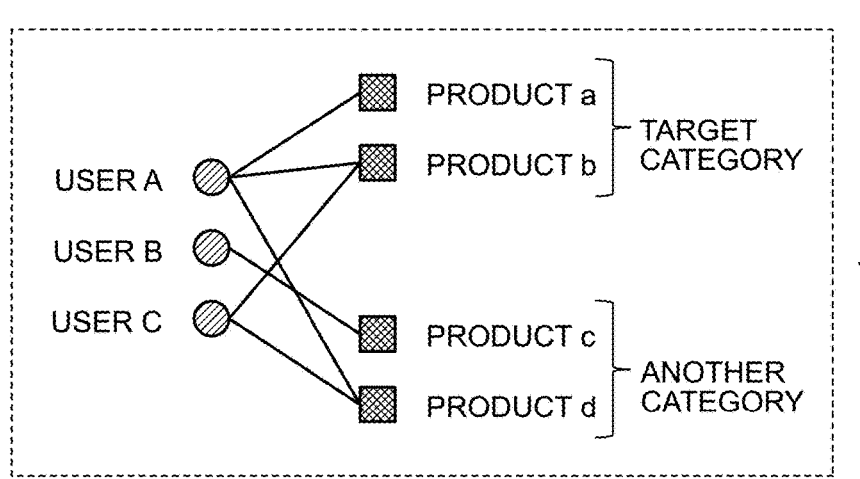
FIG. 3 is a schematic diagram of a graph.

FIG. 3 is a schematic diagram of an example of a graph 31 generated from the relational data 16A. The score calculating unit 20A generates the graph 31 representing the relationship between the user and the product for each pair of the product belonging to the target category and the product belonging to the other category included in the relational data 16A. Therefore, the score calculating unit 20A generates a plurality of graphs 31 in which combinations of other categories with respect to one target category are different for each pair of the target category and the other category on a one-to-one basis using the relational data 16A.

The graph 31 is represented by a graph structure in which a plurality of pieces of data included in the relational data 16A is linked according to the relationship represented by the relational data 16A. Specifically, the graph 31 is represented by a bipartite graph including two types of vertices of a product and a user belonging to each of a target category and another category on a one-to-one basis. This means that in the graph 31 of FIG. 3, the product and the user associated by being linked have a relationship with each other.

For example, the score calculating unit 20A extracts products belonging to a target category, products belonging to one other category, and users linked to these products from the relational data 16A, thereby generating a graph 31 corresponding to a pair of the target category and the other category.

Note that the score calculating unit 20A may generate the graph 31 by selectively linking a user with a product having an appearance frequency equal to or higher than a threshold in the relational data 16A. Furthermore, the score calculating unit 20A may generate the graph 31 in which the linkage between the user and the product having an appearance frequency equal to or higher than the threshold in the relational data 16A is deleted. These thresholds may be set in advance. Furthermore, these thresholds may be appropriately changeable according to an operation instruction or the like of the UI unit 14 by the analyst. Furthermore, the score calculating unit 20A may set a fixed threshold such as "1" as the weight of the branch indicating the linkage between the user and the product.

Furthermore, the score calculating unit 20A may generate the graph 31 in which the weight of linkage between pieces of data is adjusted. Specifically, the score calculating unit 20A may generate the graph 31 in which the weight of the linkage between pieces of data is adjusted by normalization or the like according to the number of connections to the data. For example, in a case where two products are linked to one user, the score calculating unit 20A adjusts the weight for the linkage between the user and each of the two products to ½. Furthermore, for example, in a case where only one product is linked to one user, the score calculating unit 20A adjusts the weight for the linkage between the user and the product to one. Examples of the normalization method include symmetric normalized adjacency matrix, random walk transition probability matrix, and reverse random walk transition probability matrix.

Furthermore, the score calculating unit 20A may generate the graph 31 in which the weight of linkage between pieces of data is adjusted to a specified value. That is, the score calculating unit 20A may generate the graph 31 without assigning a weight to the linkage between the pieces of data.

Next, the score calculating unit 20A calculates a score according to the degree of relationship between a pair of pieces of data constituting a pair for each pair of pieces of data defined in each graph 31 using the graph 31 generated for each pair of the target category and the other category on a one-to-one basis.

The degree of relationship represents a degree of strength of a relationship between pieces of data. For example, the larger the value of the weight assigned to the linkage between the pieces of data represented by the graph 31, the stronger the relationship between the pieces of data. Furthermore, as the number of hops from one of the pair of pieces of data represented by the graph 31 to the other is smaller, the strength of the relationship between the pieces of data is stronger. In addition, as the number of routes reaching from one of the pairs of data represented by the graph 31 to the other is larger, the strength of the relationship between the pieces of data is stronger.

In the present embodiment, as described above, a mode in which the relational data 16A is purchase data will be described as an example. Therefore, in the present embodiment, the score calculating unit 20A calculates a score according to the degree of relationship between the user and the product for each pair of the user and the product included in the graph 31.

For example, for each pair of the user and the product included in the graph 31, the score calculating unit 20A calculates, as the score of the pair, the number of paths that is the number of routes reaching from one data to another data constituting the pair with a predetermined number of hops or less.

Specifically, the score calculating unit 20A specifies a pair with each of a plurality of products included in the graph 31 for each of users included in the graph 31. Then, the score calculating unit 20A calculates, for each specified pair, the number of paths reaching the product from the users constituting the pair at K-hop or less. K is an integer of 2 or more, and may be determined in advance. Furthermore, K may be appropriately changeable according to an operation instruction of the UI unit 14 by the analyst or the like.

Furthermore, for example, the score calculating unit 20A may calculate, for each pair of the user and the product included in the graph 31, a weighted average value of the number of paths, which is the number of routes reaching from one data to another data constituting the pair with a predetermined number of hops or less, as the score of the pair.

Specifically, for example, among users A to F and products a to e, a pair of the user A and the product d in the graph 31 illustrated in FIG. 3 is assumed. In this case, there are two paths including a path reaching from the user A to the product d, which is reached in three hops via the product b and the user C, and a path reaching from the user A directly reaching the product d in one hop. In this case, the score calculating unit 20A calculates "2", which is a weighted average ((3+1)/2)) by the total number of paths 2 of the number of hops 3 and the number of hops 1, as the score for the pair of user A and product d.

Here, when the adjacent matrix of the graph 31 is used, the number of paths equal to or less than K-hop corresponds to the value of the product when the adjacent matrix is multiplied by K times. In general, the number of branches, which is the linkage between the pieces of data included in the graph 31, is sparse. Therefore, the number of paths equal to or less than K-hop corresponds to a product of sparse matrices. That is, by calculating the score using the graph 31, the score calculating unit 20A can calculate the score by utilizing a data structure suitable for a sparse matrix, and can calculate the calculated score at high speed.

In addition, the score calculating unit 20A may calculate the score by using an average value of the number of paths at the time of a specific number of hops, a sum of the number of paths, or a weighted sum of the number of paths, instead of the number of paths of K-hop or less.

Furthermore, the score calculating unit 20A may calculate a value represented by an inner product of a first matrix obtained by multiplying the adjacent matrix of the graph 31 by a predetermined matrix of dimensions according to the number of dimensions of data of the graph 31 and a transposed matrix of the first matrix as the score for each pair of pieces of data. The predetermined matrix is represented by a matrix of the data dimension of the graph 31×a predetermined dimension equal to or more than one dimension.

Figure 4:
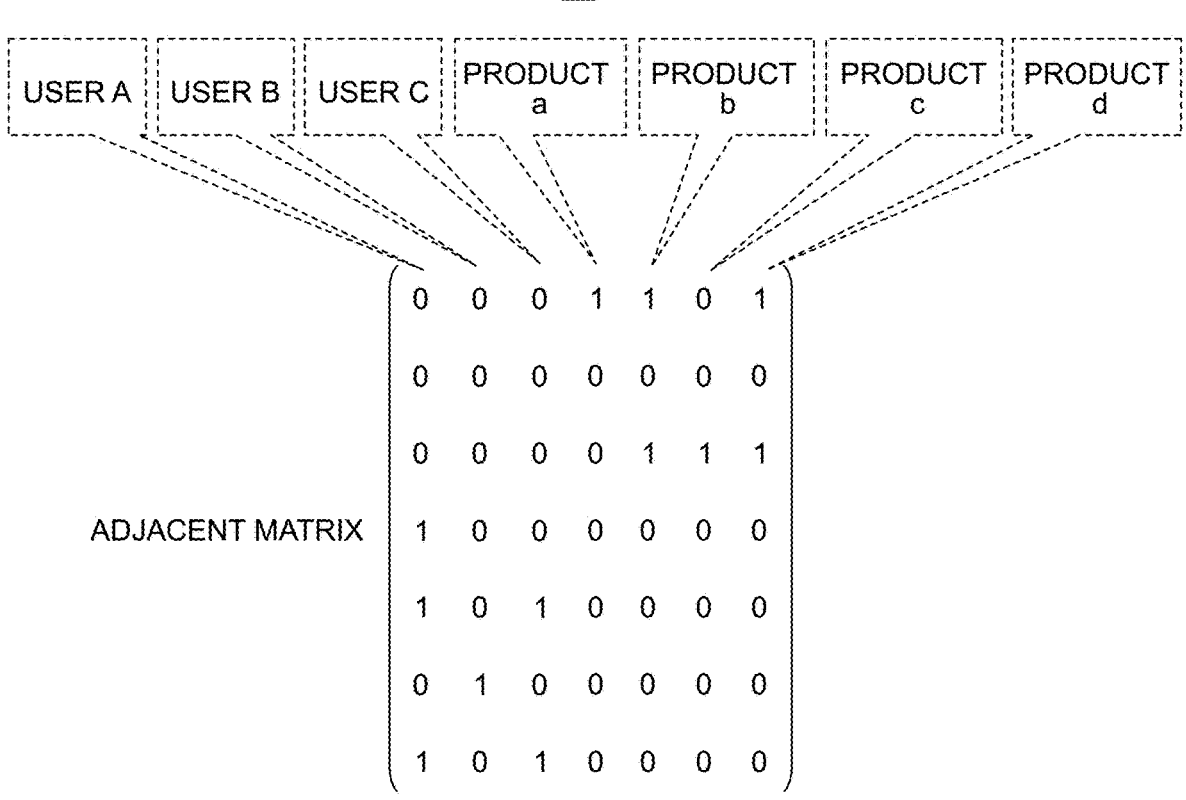
FIG. 4 is an explanatory diagram of an adjacent matrix.

FIG. 4 is an explanatory diagram of an example of an adjacent matrix 32. FIG. 4 is an example of the adjacent matrix 32 of the graph 31 illustrated in FIG. 3.

For example, the score calculating unit 20A prepares a first matrix A of the data dimension×the designated dimension by multiplying the predetermined matrix of the data dimension of the graph 31×the designated dimension by the adjacent matrix 32. When the inner product of the first matrix A and the transposed matrix of the first matrix A is calculated, a matrix of data dimension represented by the graph 31×data dimension is obtained. The score calculating unit 20A calculates an i·j component of the matrix as a score between the i-th data and the j-th data.

The predetermined matrix may be a matrix obtained by subjecting the adjacent matrix 32 to matrix decomposition, or may be a matrix generated by a random number. In addition, the score calculating unit 20A may calculate, as a score, an inner product of an average value of the plurality of first matrices A obtained by changing the number of times of multiplication between the predetermined matrix and the adjacent matrix 32 and a transposed matrix of the average value.

Through these processes, the score calculating unit 20A calculates a score according to the degree of relationship between the user and the product for each pair of the user and the product included in the graph 31.

The score calculating unit 20A registers the calculated score in the score DB 16B in association with the pair of the user and the product.

FIG. 5 is a schematic diagram of an example of a data configuration of the score DB 16B. The score DB 16B is a database in which pairs of data included in the graph 31 are associated with scores calculated for the pairs. In the present embodiment, a mode in which a pair of pieces of data included in the graph 31 is a pair of a user and a product will be described as an example.

The score calculating unit 20A calculates a score according to the degree of relationship between the user and the product included in the graph 31 for each pair of the graph 31 corresponding to each of a plurality of pairs of different combinations of other categories for the target category, so that a plurality of score DBs 16B are generated and stored in the storage unit 16 for each pair of the target category and the other category on a one-to-one basis.

Returning to FIG. 1, the description will be continued.

The relevance degree calculating unit 20B calculates the degree of relevance between the target category to be analyzed and another category other than the target category on the basis of the score calculated for each pair of pieces of data and the evaluation index for evaluating the degree of relevance between the categories.

First, the relevance degree calculating unit 20B reads the score for each pair of pieces of data registered in the score DB 16B from the score DB 16B.

Then, the relevance degree calculating unit 20B calculates the degree of relevance between the target category corresponding to the graph 31 and another category by using the read score for each pair and the evaluation index.

The degree of relevance represents a degree of relevance between categories. For example, a higher match rate, overlap rate, or similarity rate between groups of data belonging to each of the plurality of categories indicates a higher degree of relevance between the categories. Furthermore, the stronger the causal relationship between the groups of data belonging to each of the plurality of categories, the higher the degree of relevance between the categories.

The evaluation index may be stored in the storage unit 16 in advance. In this case, the relevance degree calculating unit 20B may read the evaluation index from the storage unit 16 and calculate the degree of relevance using the read evaluation index.

Examples of the evaluation index include Area Under the ROC Curve (AUC), Recall, Precision, F-measure, normalized Discounted Cumulated Gain (nDCG), and Mean Reciprocal Rank (MRR). Note that the evaluation index only needs to be an evaluation index capable of calculating the degree of relevance using the score between the pieces of data and the graph 31, and is not limited to these evaluation indexes.

Regardless of which of these evaluation indexes is used, the relevance degree calculating unit 20B can calculate the degree of relevance if there are the score between pieces of data and the graph 31.

Note that the relevance degree calculating unit 20B may calculate a value obtained by combining a plurality of evaluation indexes of different types as the degree of relevance. Specifically, the relevance degree calculating unit 20B may calculate an average value of values using the plurality of evaluation indexes or a weighted average value of values using the plurality of evaluation indexes as the degree of relevance between the target category and another category.

In addition, the relevance degree calculating unit 20B may calculate a value of an evaluation index satisfying a preset constraint as the degree of relevance.

For example, the relevance degree calculating unit 20B sets a threshold for each of the plurality of evaluation indexes. Specifically, it is also possible to set a constraint such as a case where Precision is the maximum among values of AUC greater than or equal to a threshold. Then, the relevance degree calculating unit 20B may calculate a value by the evaluation index that satisfies the constraint as the degree of relevance.

In addition, the relevance degree calculating unit 20B may selectively use only data in which the analyst is particularly interested among pieces of data included in the graph 31 and calculate a value by the evaluation index as the degree of relevance. When the number of pieces of data included in the graph 31 is large, it may take time to calculate the evaluation index. In this case, the degree of relevance may be calculated after data is sampled at the time of calculating the degree of relevance using the evaluation index. Specifically, the relevance degree calculating unit 20B may calculate the degree of relevance on the basis of the score calculated for each of some pairs sampled from a plurality of pairs included in the graph 31 and the evaluation index. For example, the relevance degree calculating unit 20B may sample N (N is an integer of 1 or more) pairs of pieces of data in descending order of scores to calculate the degree of relevance. A method of focusing on N (N is an integer of 1 or more) pairs of pieces of data in descending order of scores may be referred to as Precision@K or Recall@K.

In addition, the value of Precision or Recall, which is an example of the evaluation index, can be obtained for each piece of data. Therefore, when Precision and Recall are used as the evaluation indexes, the relevance degree calculating unit 20B may calculate an average of values obtained by Precision and Recall as the degree of relevance.

Note that the relevance degree calculating unit 20B may calculate the degree of relevance using an evaluation index input by an operation instruction of the UI unit 14 by the analyst.

For the analysis of the data included in the relational data 16A, different evaluation indexes may be used depending on the analysis scenario utilized by the analyst. For example, in the field of product recommendation, there is a case where the user is interested only in products recommended at a high rank among many products. Therefore, in this case, Precision or Recall is often used as the evaluation index. On the other hand, in the tendency pattern analysis, since it is necessary to capture characteristics of the entire data, AUC or the like is often used as an evaluation index.

Therefore, the analyst operates the UI unit 14 to input an evaluation index according to the analysis scenario handled by the analyst. Then, the relevance degree calculating unit 20B may calculate the degree of relevance by using the evaluation index that has received the input by the operation instruction of the UI unit 14 by the analyst.

Furthermore, the relevance degree calculating unit 20B may calculate the degree of relevance using an evaluation index received from an external information processing apparatus.

Returning to FIG. 1, the description will be continued.

The output control unit 20F outputs various types of information to the UI unit 14. When the degree of relevance between the target category and another category is calculated by the relevance degree calculating unit 20B, the output control unit 20F outputs information regarding the degree of relevance to the UI unit 14.

FIG. 6 is a schematic diagram of an example of an output result of the degree of relevance between the target category and another category.

For example, the output control unit 20F displays relevance degree information 16C representing the degree of relevance calculated for each pair of the target category and another category on the UI unit 14. For example, it is assumed that the target category is "soft drink" and other categories are "tea", "lunch box", and "snack". In this case, the output control unit 20F displays, on the UI unit 14, relevance degree information 16C indicating the degree of relevance between the target category "soft drink" and each of the other categories, the degree of relevance being calculated by the relevance degree calculating unit 20B.

Furthermore, the output control unit 20F may transmit the relevance degree information 16C to an external information processing apparatus via the communication unit 12.

Returning to FIG. 1, the description will be continued.

The processing unit 20 executes various sub-tasks such as analysis and proposal on the basis of the degree of relevance between the target category and another category calculated by the relevance degree calculating unit 20B. For example, the processing unit 20 may execute the sub-task using a predetermined number of degrees of relevance in descending order of the degrees of relevance among the degrees of relevance between the target category and the other categories. Furthermore, the processing unit 20 may output the degree of relevance between the target category and another category calculated by the relevance degree calculating unit 20B to an external information processing apparatus via the communication unit 12. In this case, the external information processing apparatus may execute the sub-task.

In the present embodiment, a mode in which the processing unit 20 executes a subtask will be described as an example. As a functional unit that executes a sub-task, the processing unit 20 further includes at least one of a target graph generating unit 20C, a representation vector calculating unit 20D, and a tendency pattern extracting unit 20E.

The target graph generating unit 20C specifies another category similar to the target category using the degree of relevance. Then, the target graph generating unit 20C generates a target graph in which data belonging to the specified other category and data belonging to the target category are linked according to the degree of relevance and which is represented in a graph structure.

Figure 7:
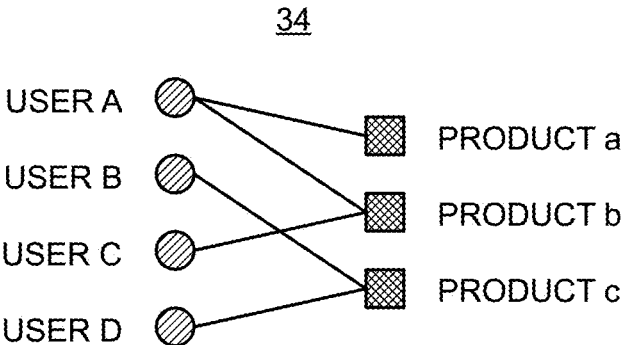
FIG. 7 is a schematic diagram of a target graph.

FIG. 7 is a schematic diagram of an example of a target graph 34. The target graph generating unit 20C extracts another category having a high degree of relevance with respect to the target category using the degree of relevance between the target category and the other category calculated by the relevance degree calculating unit 20B.

The high degree of relevance means that a value represented by the degree of relevance is equal to or greater than a threshold. The threshold may be set in advance. Furthermore, the threshold may be appropriately changeable according to an operation instruction or the like of the UI unit 14 by the analyst. In addition, the term "high degree of relevance" may indicate M pieces in descending order of degrees of relevance among a plurality of pairs of the target category and the other category calculated by the relevance degree calculating unit 20B. M is an integer of 2 or more, and may be determined in advance. Specifically, in the method of determining the value of M, the degree of relevance that is the value of the evaluation index calculated using only the data belonging to the target category may be set as the reference degree of relevance, and the degree of relevance within a predetermined range of the reference degree of relevance may be a value that can be specified as another category having a high degree of relevance.

Then, the target graph generating unit 20C generates a new target graph 34 by using the target category and the extracted other category.

The target graph 34 is a graph in which data belonging to a target category is linked to data existing in another extracted category having a high degree of relevance with respect to the target category. Specifically, the target graph 34 is represented by a bipartite graph including two vertexes of a target category, a product belonging to each of the other categories, and a user. In the target graph 34 of FIG. 7, it means that the product and the user associated by being linked have a degree of relevance equal to or greater than a threshold value.

The target graph 34 created by the target graph generating unit 20C can be used for recommendation, tendency analysis, and the like. The recommendation means processing of extracting a list of data such as products recommended or suggested to a certain user.

Returning to FIG. 1, the description will be continued. The representation vector calculating unit 20D calculates a representation vector of each of a plurality of pieces of data included in the target graph 34 using the target graph 34.

Figure 8:
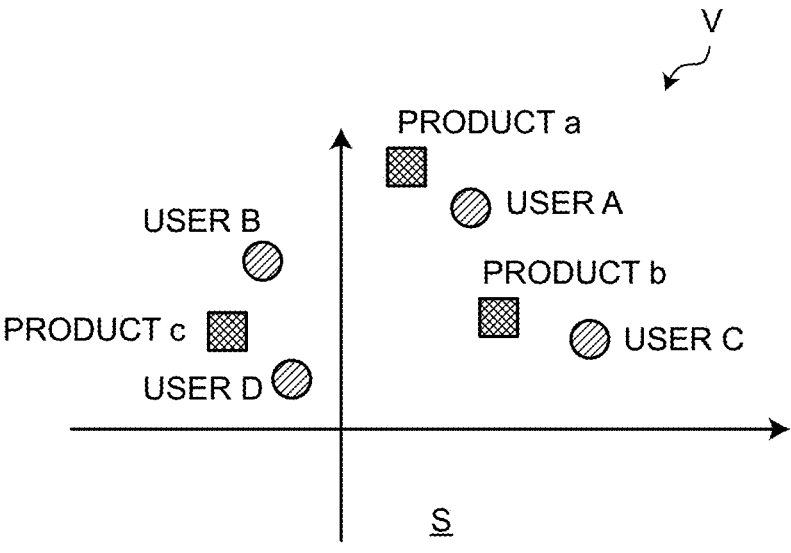
FIG. 8 is an explanatory diagram of a representation vector.

FIG. 8 is an explanatory diagram of an example of a representation vector V. FIG. 8 illustrates a representation vector V of each of a plurality of pieces of data included in the target graph 34 illustrated in FIG. 7. The representation vector V is arranged in a vector space S.

The representation vector V is a distributed representation of data. The representation vector V is information representing data by a plurality of features, and is represented by a multidimensional vector having a plurality of features as elements. The number of multidimensional dimensions is, for example, 768, but is not limited to this number of dimensions. When the data are represented with representation vectors V, as the data have higher degree of relevance and are more similar, the representation vectors V indicate closer values.

The representation vectors V are generated by learning such that data having a higher degree of relevance have more similar vectors. Examples of a learning method of the representation vector include matrix decomposition, non-negative matrix factorization (NMF), graph neural network (GNN), and the like.

That is, the representation vector calculating unit 20D calculates the representation vector V on the basis of the learning result of the graph structure of the target graph 34 using a graph analysis technique such as matrix decomposition, NMF, GNN, or the like. In other words, the representation vector calculating unit 20D calculates the representation vector V of each piece of data included in the target graph 34 so as to hold the graph structure of the target graph 34.

Here, in many data analysis methods such as clustering and regression, it is assumed that data is vector representation. Therefore, by generating the representation vector V by the representation vector calculating unit 20D, it is possible to provide information applicable to various data analysis methods. In addition, as described above, the representation vectors V indicate closer values as the data have higher degrees of relevance and are more similar. Therefore, by generating the representation vector V by the representation vector calculating unit 20D, it is possible to provide information capable of easily capturing the relationship and features between pieces of data. Furthermore, the representation vector V generated by the representation vector calculating unit 20D can be applied to various sub-tasks. In addition, since parallelization calculation and the like can be performed by representing data in a vector format, it is possible to shorten the time required for data analysis.

Returning to FIG. 1, the description will be continued.

The tendency pattern extracting unit 20E extracts a tendency pattern of a plurality of pieces of data represented by the representation vector V on the basis of the feature represented by the representation vector V.

Figure 9:
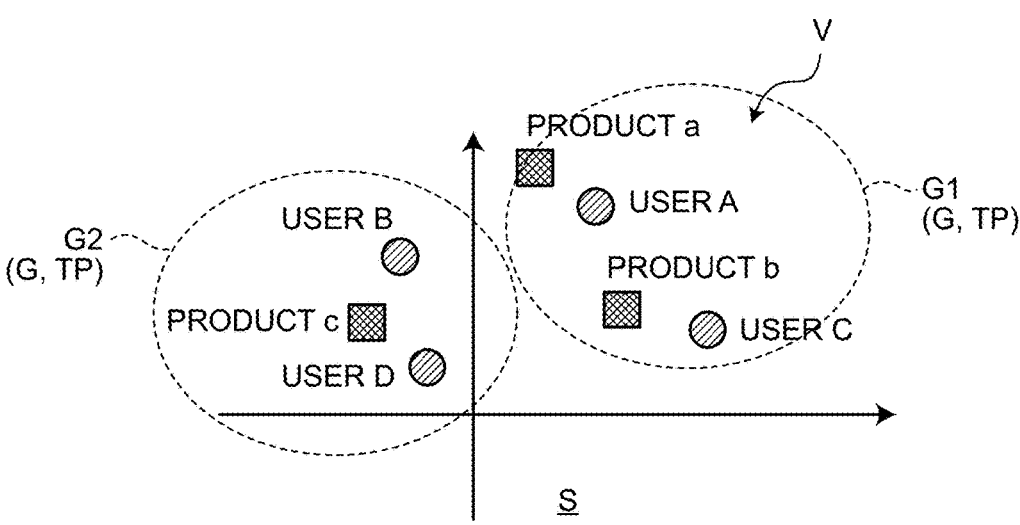
FIG. 9 is an explanatory diagram of extraction of a tendency pattern.

FIG. 9 is an explanatory diagram of an example of extraction of a tendency pattern TP. FIG. 9 illustrates an example of extraction of a tendency pattern TP of a plurality of pieces of data represented by the representation vector V illustrated in FIG. 8.

The tendency pattern extracting unit 20E extracts the tendency pattern TP of the data represented by the representation vector V by clustering a plurality of pieces of data included in the target graph 34 using the representation vector V of the data. Specifically, the tendency pattern extracting unit 20E clusters a plurality of pieces of data included in the target graph 34 for each group of data represented by the similar representation vectors V. FIG. 9 illustrates, as an example, a state in which a plurality of pieces of data included in the target graph 34 is clustered into two groups G of a group G1 and a group G2. As the clustering method, for example, a Gaussian mixture model or aggregated clustering may be used. Furthermore, when performing clustering, the tendency pattern extracting unit 20E may perform preprocessing such as normalization of data and removal of data indicating outliers.

Returning to FIG. 1, the description will be continued.

The output control unit 20F may output information indicating the tendency pattern TP extracted by the tendency pattern extracting unit 20E to the UI unit 14. That is, the output control unit 20F may output the extraction result by the tendency pattern extracting unit 20E to the UI unit 14.

For example, the output control unit 20F may output an image illustrated in FIG. 9 to the UI unit 14 as information indicating the tendency pattern TP extracted by the tendency pattern extracting unit 20E. The output control unit 20F may output the clustering result to the UI unit 14 by displaying a group of data belonging to the same group G represented by the tendency pattern TP extracted by the tendency pattern extracting unit 20E for each group. Furthermore, the output control unit 20F may further display a frame surrounding the group of data classified into the same group G by clustering to highlight the clustering result. Furthermore, the output control unit 20F may output the tendency pattern TP extracted by the tendency pattern extracting unit 20E to the UI unit 14 in a table format.

Furthermore, the output control unit 20F may further display an analysis result obtained by performing principal component analysis or the like on the representation vector V on the UI unit 14. For the principal component analysis, a known analysis method may be used. Furthermore, the output control unit 20F may perform normalization and removal of outliers as preprocessing of data when performing the principal component analysis and clustering.

Furthermore, the output control unit 20F may further output the generated target graph 34 to the UI unit 14. Furthermore, the output control unit 20F may further output, to the UI unit 14, information indicating the relationship between each of the types and the number of other categories with respect to the target category included in the target graph 34 and the calculated degree of relevance.

Figure 10:
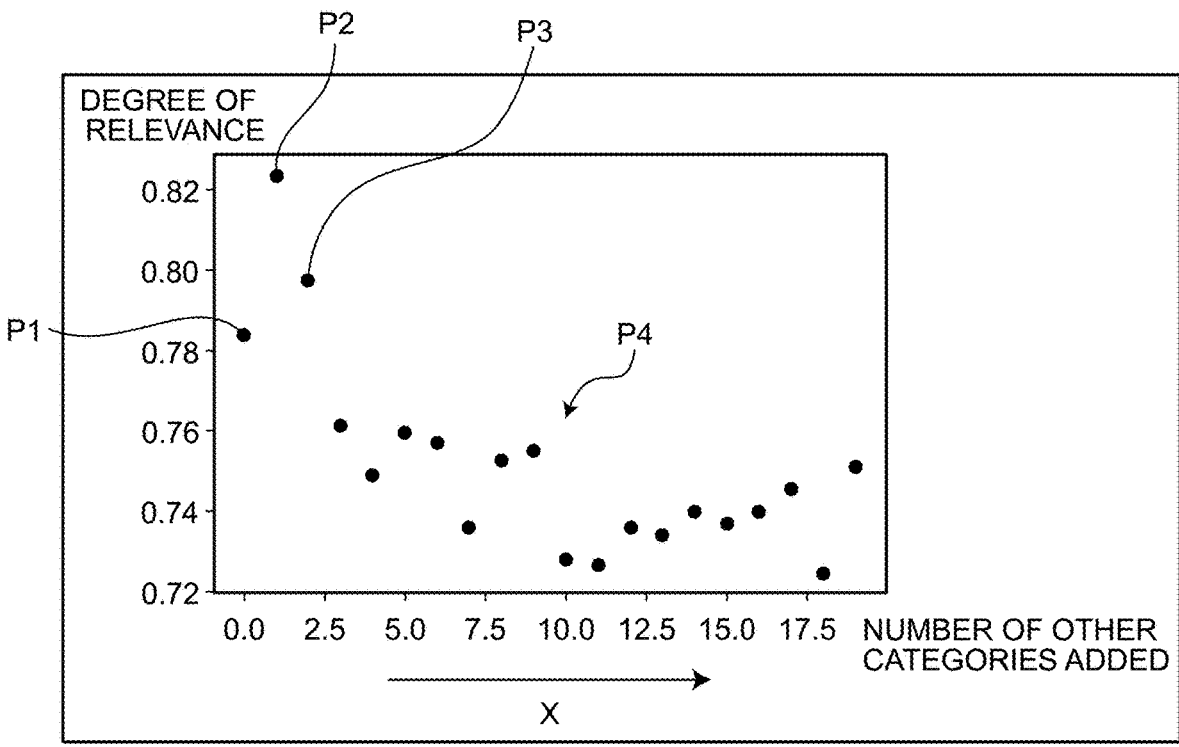
FIG. 10 is a schematic diagram illustrating a relationship between a type and the number of other categories with respect to a target category and a calculated degree of relevance.

FIG. 10 is a schematic diagram illustrating a relationship between the type and number of other categories with respect to the target category included in the target graph 34 used for calculation of the degree of relationship and the calculated degree of relevance. In FIG. 10, the horizontal axis represents the number of other categories added, and the vertical axis represents the degree of relevance.

In FIG. 10, a plot P1 is a plot when zero other category is used, that is, when the target graph 34 is generated by learning using only the target category and the degree of relevance is calculated. A plot P2 is a plot when the target graph 34 is generated by learning using the target category and one other category having the highest score for the target category and the degree of relevance is calculated. A plot P3 is a plot when the target graph 34 is generated by learning using the target category and two other categories in descending order of scores for the target category and the degree of relevance is calculated. A plot P4 is a plot when the target graph 34 is generated by learning using the target category and three or more other categories in descending order of scores for the target category and the degree of relevance is calculated.

As illustrated in FIG. 10, when the target graph 34 generated by learning using the target category and one other category having the highest score for the target category is used, it can be said that the degree of relevance with higher accuracy can be calculated as compared with a case where zero other category is used or a case where the target graph 34 using two or more other categories is used.

Next, an example of a flow of information processing executed by the processing unit 20 of the information processing apparatus 10 according to the present embodiment will be described.

Figure 11:
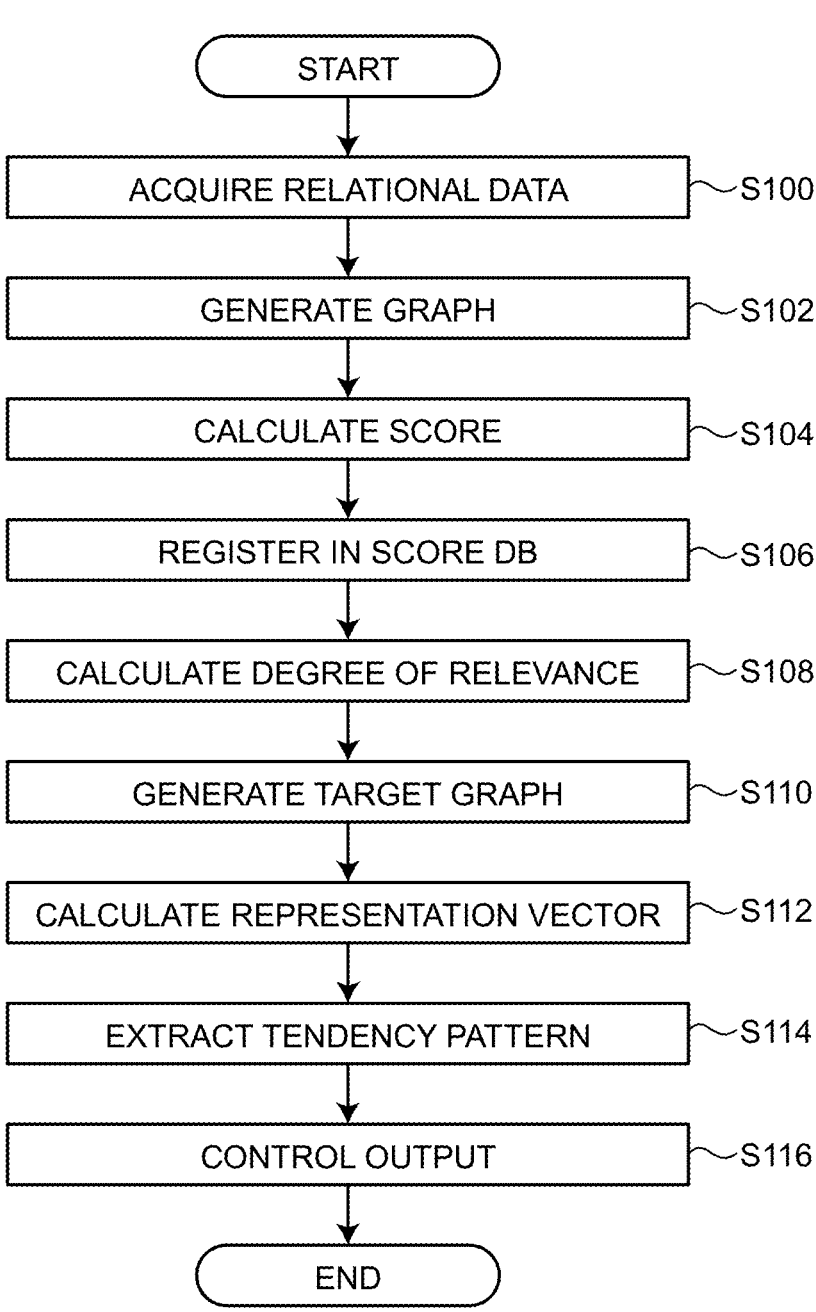
FIG. 11 is a flowchart illustrating a flow of information processing.

FIG. 11 is a flowchart illustrating an example of a flow of information processing executed by the processing unit 20 of the information processing apparatus 10 according to the present embodiment.

The score calculating unit 20A acquires the relational data 16A (step S100). For example, the score calculating unit 20A acquires the relational data 16A by reading the relational data 16A stored in the storage unit 16.

The score calculating unit 20A generates a graph 31 in which the relational data 16A acquired in step S100 is represented by a graph structure (step S102). The score calculating unit 20A generates the graph 31 representing the relationship between the user and the product for each pair of a product belonging to the target category and a product belonging to the other category included in the relational data 16A acquired in step S100 on a one-to-one basis.

The score calculating unit 20A calculates a score according to the degree of relationship between a pair of pieces of data constituting a pair for each pair of pieces of data defined in each graph 31 using the graph 31 generated for each pair of the target category and the other category (step S104). Then, the score calculating unit 20A registers the score calculated in step S104 in the score DB 16B in association with the pair of the corresponding product and the user (step S106).

The relevance degree calculating unit 20B calculates the degree of relevance between the target category to be analyzed to which the data belongs and another category other than the target category on the basis of the score calculated for each pair of pieces of data and the evaluation index (step S108).

The target graph generating unit 20C specifies another category similar to the target category using the degree of relevance calculated in step S108. Then, the target graph generating unit 20C generates the target graph 34 in which data belonging to the specified other category and data belonging to the target category are linked according to the degree of relevance and represented in a graph structure (step S110).

The representation vector calculating unit 20D calculates the representation vector V of each of the plurality of pieces of data included in the target graph 34 using the target graph 34 generated in step S110 (step S112).

The tendency pattern extracting unit 20E extracts the tendency pattern TP of the plurality of pieces of data represented by the representation vector V calculated in step S112 on the basis of the feature represented by the representation vector V (step S114).

The output control unit 20F outputs at least one of the information regarding the degree of relevance calculated in step S108, the target graph 34 generated in step S110, the representation vector V calculated in step S112, and the tendency pattern TP extracted in step S114 to the UI unit 14 (step S116).

Then, this routine is ended.

As described above, the information processing apparatus 10 according to the present embodiment includes the processing unit 20. The processing unit 20 calculates, for each pair of pieces of data defined in a graph representing relational data 16A indicating a relationship between a plurality of pieces of data in a graph structure, a degree of relevance between the target category to be analyzed and another category other than the target category on the basis of a score calculated according to a degree of relationship between a pair of pieces of data constituting the pair and an evaluation index for evaluating the degree of relevance between the categories.

Here, use of the relational data 16A indicating the relationship between the pieces of data has been accelerated with the progress of IoT in recent years. The relational data 16A include purchase data indicating who bought what, application data indicating which company an individual in job seeking has applied to, and the like. In particular, in recent years, attribute data such as a product category in the purchase data and an industry of a company in the application data are also being collected. Under such circumstances, a need for deep analysis for data of a specific category is increasing. For example, regarding purchase data, a task such as to whom a product of a certain category should be recommended corresponds to promotion, and a tendency pattern of a product of a certain category is useful from the viewpoint of marketing. Similarly, in the application data, it is assumed that analysis of an application pattern of a company in a specific industry, matching between an individual and a company in a specific industry, or the like is performed.

The relational data 16A such as purchase data includes information on products in a wide category. For this reason, in practice, an analyst often performs analysis focusing on a product of a specific target category. Therefore, the analyst needs to select a product of another category having a high degree of relevance with respect to the target category to which the product to be analyzed belongs according to the analysis scenario. As a conventional technique, a technique is disclosed in which a degree of relevance between a target category to which certain data belongs and another category other than the target category is obtained by clustering or grouping a plurality of pieces of data included in the relational data 16A. As the clustering or grouping, a technique of performing clustering from purchase data using non-negative matrix decomposition, a technique of defining a unique index on the basis of a purchase trend and grouping data, and the like are disclosed. In the conventional technique, a degree of relevance between a target category and another category is obtained from a degree of overlap with a group to which a product belonging to the target category belongs. Furthermore, for example, a community such as a cluster of products is extracted by using a community detection technique for the relational data 16A. Further, a technique is disclosed in which another category having many products belonging to the same community as the products belonging to the target category is regarded as having a high degree of relevance with respect to the target category.

However, in the conventional technique, in a case where the number of pieces of data belonging to the target category is small in all data, it may be difficult to extract another category having a high degree of relevance with respect to the target category.

Furthermore, from the viewpoint of the evaluation index, different indexes are used depending on the analysis scenario, such as Recall in a case where promotion is performed, and AUC in a case where user profiling is performed. For this reason, in the conventional technique, in a case where the feature of the evaluation index is not considered at the time of extraction of another category related to the target category, the calculation accuracy of the degree of relevance may decrease.

That is, in the conventional technique, it may be difficult to provide the degree of relevance between the target category and another category with high accuracy.

On the other hand, in the information processing apparatus 10 of the present embodiment, the degree of relevance between the target category and the other category is calculated on the basis of the score according to the degree of relationship for each pair of pieces of data defined in the graph 31 and the evaluation index by using the graph 31 in which the relational data 16A is represented in a graph structure. That is, in the information processing apparatus 10 of the present embodiment, the degree of relevance between the target category and the other category is calculated by using the graph 31 generated from the relational data 16A for each pair of the target category and the other category on a one-to-one basis, instead of the relational data 16A including the data belonging to each of the plurality of types of categories. Therefore, the information processing apparatus 10 of the present embodiment can extract another category having a high degree of relevance with respect to the target category with high accuracy even in a case where the number of pieces of data belonging to the target category is small in all data. Furthermore, in the information processing apparatus 10 of the present embodiment, since the degree of relevance is calculated using the graph 31, the degree of relevance can be calculated with high accuracy in a case where the feature of the evaluation index is not considered at the time of extraction of another category related to the target category, that is, even in a case where any evaluation index is used.

Therefore, the information processing apparatus 10 of the present embodiment can provide the degree of relevance between the target category and another category with high accuracy.

Furthermore, the information processing apparatus 10 of the present embodiment uses the graph 31 to calculate the degree of relevance using the number of paths, which is the number of routes reaching from one data to another data constituting the pair with a predetermined number of hops or less, or the adjacent matrix of the graph 31. Therefore, in addition to the above effects, the information processing apparatus 10 of the present embodiment can calculate the degree of relationship in a short time and with high accuracy.

Second Embodiment

Figure 12:
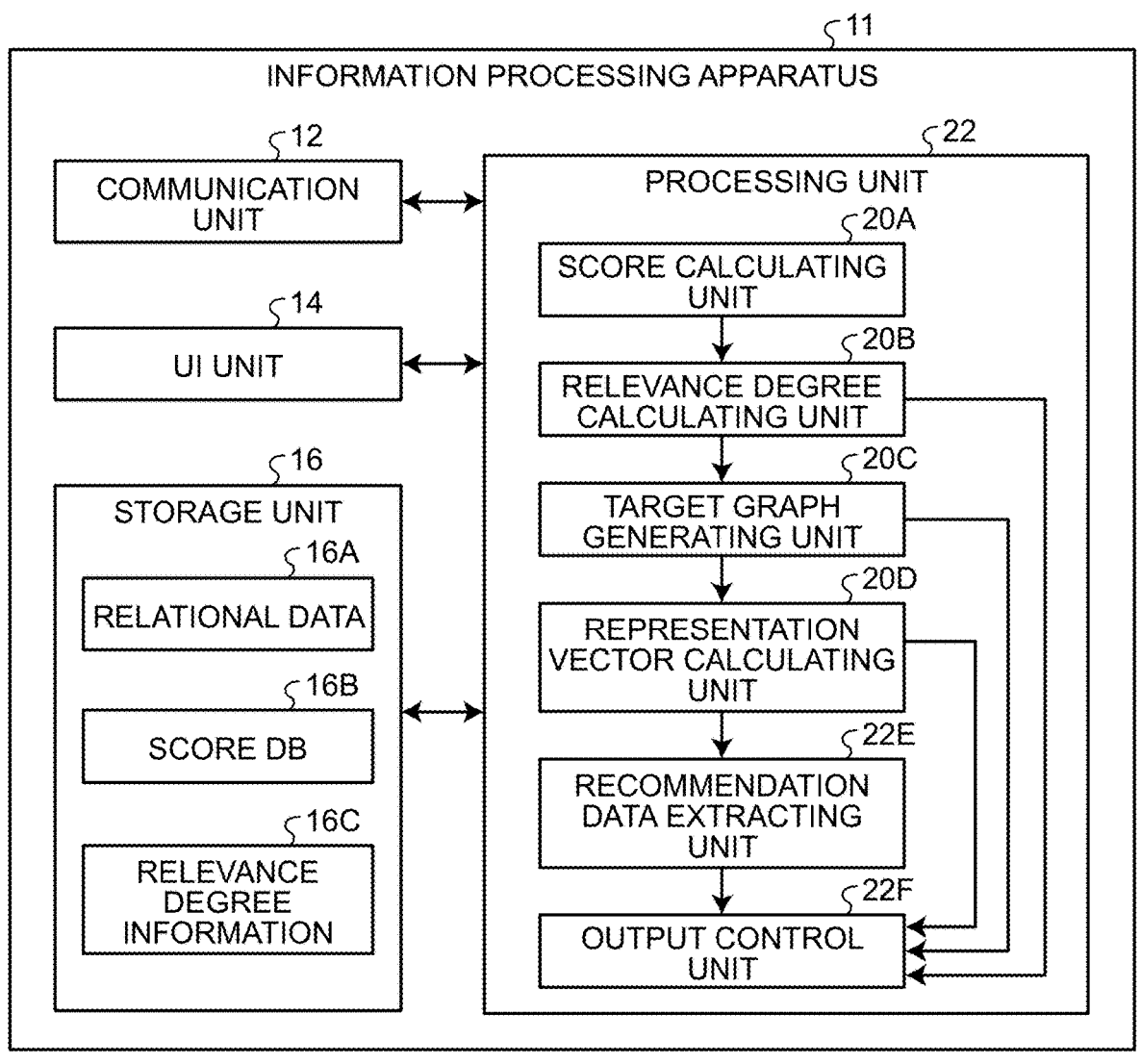
FIG. 12 is a diagram illustrating a functional configuration of the information processing apparatus.

FIG. 12 is a diagram illustrating an example of a functional configuration of an information processing apparatus 11 according to the present embodiment.

The information processing apparatus 11 is similar to the information processing apparatus 10 of the above embodiment except that a processing unit 22 is included instead of the processing unit 20. The processing unit 22 is similar to the processing unit 20 of the above embodiment except that a recommendation data extracting unit 22E and an output control unit 22F are included instead of the tendency pattern extracting unit 20E and the output control unit 20F.

The recommendation data extracting unit 22E extracts, as recommendation data for each of the plurality of pieces of data, another data group having a similarity equal to or greater than a predetermined value with respect to each of the plurality of pieces of data represented by the representation vector V, on the basis of the similarity between the plurality of pieces of data represented by the representation vector V calculated by the representation vector calculating unit 20D.

Specifically, the recommendation data extracting unit 22E specifies data to be recommended by using the representation vector V of each piece of data. For example, it is assumed that the relational data 16A is purchase data. In this case, the recommendation data extracting unit 22E extracts a product of a representation vector V similar to the representation vector V corresponding to each user as recommendation data to be recommended. As the similarity of the representation vector V, a value such as a distance between vectors of the representation vector V, cosine similarity, or an inner product may be used. Then, the recommendation data extracting unit 22E may extract, as recommendation data to be recommended, products for which the value of the representation vector V is equal to or less than a predetermined value, for the representation vector V corresponding to each user. The predetermined value may be set in advance. Furthermore, the predetermined value may be appropriately changeable by an operation instruction or the like of the UI unit 14 by the analyst.

Furthermore, the recommendation data extracting unit 22E may extract data to be recommended by using a value calculated using a neural network for the representation vector V of the user and the product.

Similarly to the above embodiment, the output control unit 22F outputs at least one of the information regarding the calculated degree of relevance, the target graph 34, the representation vector V, and the extracted recommendation data to at least one of the UI unit 14 and the external information processing apparatus.

In the present embodiment, the output control unit 22F outputs data included in the target graph 34 and recommendation data corresponding to the data to at least one of the UI unit 14 and the external information processing apparatus in association with each other. That is, for data included in the target graph 34, the output control unit 22F outputs recommendation data to be recommended for the data.

FIG. 13 is a schematic diagram of an example of output information 40 including recommendation data. FIG. 13 illustrates, as an example, output information 40 representing recommendation data in a table format.

For example, the recommendation data extracting unit 22E extracts, as recommendation data to be recommended to the user A, a product of a representation vector V similar to the representation vector V of the user A, which is an example of data, on the basis of the representation vector V of each piece of data included in the target graph 34 (see FIG. 8). Then, the output control unit 22F outputs the output information 40 including the extracted recommendation data to the UI unit 14. At this time, for example, the output control unit 22F may assign a ranking number indicating that the product is ranked higher as the similarity of the representation vector V is higher to the product, and output the output information 40 in a table format in which the ranking number and the product are associated with each other to the UI unit 14. Note that the output control unit 22F is not limited to the form of outputting the output information 40 in a table format.

Furthermore, for example, a case is assumed where the target category is "fresh vegetable", and the other categories to which the products of the representation vector V similar to the representation vector V of the products belonging to "fresh vegetable" belong are "egg" and "meat".

In this case, for example, the output control unit 22F may output, to the UI unit 14, the output information 40 including the products belonging to the target category "fresh vegetable", the degree of relevance calculated using only the target category at the time of generating the target graph 34, and the degree of relevance calculated using the other categories "meat" and "egg". Furthermore, the output control unit 22F may output, to the UI unit 14, the output information 40 further including the product having the maximum number of paths among the products belonging to the other category.

FIG. 14 is a schematic diagram of an example of output information 41. The output information 41 includes products belonging to the target category "fresh vegetable", a degree of relevance when calculated using only the target category, a degree of relevance when calculated using the target category "fresh vegetable" and other categories "meat" and "egg", an improvement ratio of the degree of relevance, and products having the maximum number of paths in the "meat" and "egg" categories.

For example, by the output control unit 22F displaying the output information 41 on the UI unit 14, it is possible to provide information indicating that the product "egg" is necessary in order to improve the degree of relevance of another category similar to the target category to which the product "tomato" belongs. Similarly, for example, by the output control unit 22F displaying the output information 41 on the UI unit 14, in order to improve the degree of relevance of another category similar to the target category to which the product "cucumber" belongs, it is possible to provide information indicating that the product "sausage" is necessary. Similarly, in order to improve the degree of relevance of another category similar to the target category to which the product "asparagus" belongs, it is possible to provide information indicating that the product "quail egg" is effective.

Next, an example of a flow of information processing executed by the processing unit 22 of the information processing apparatus 11 according to the present embodiment will be described.

Figure 15:
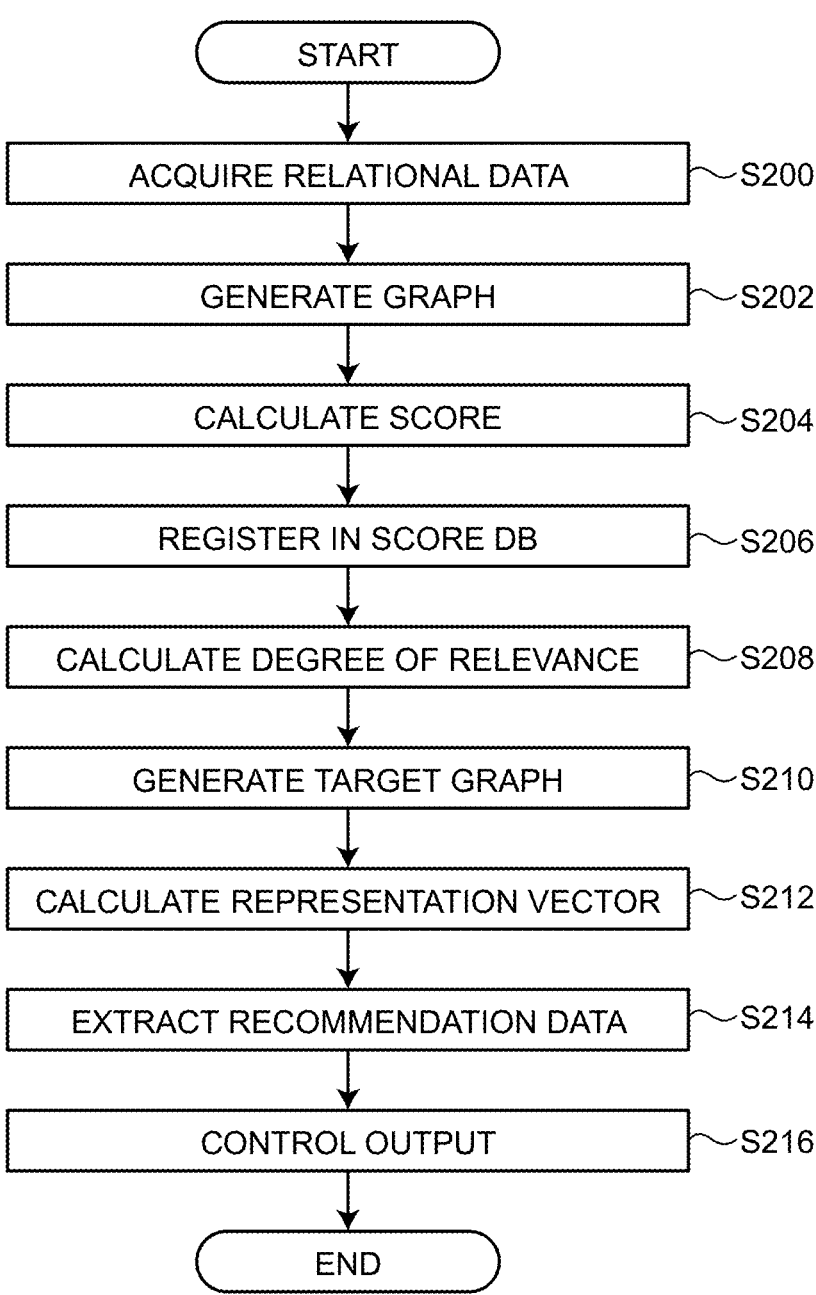
FIG. 15 is a flowchart illustrating an example of a flow of information processing.

FIG. 15 is a flowchart illustrating an example of a flow of information processing executed by the processing unit 22 of the information processing apparatus 11 according to the present embodiment.

The processing unit 22 executes the processing of steps S200 to S212 in the same manner as steps S100 to S112 of the above embodiment (see FIG. 11).

Specifically, the score calculating unit 20A acquires the relational data 16A (step S200). The score calculating unit 20A generates a graph 31 in which the relational data 16A acquired in step S200 is represented in a graph structure (step S202). The score calculating unit 20A calculates a score according to the degree of relationship between a pair of pieces of data constituting a pair for each pair of pieces of data defined in each graph 31 using the graph 31 generated for each pair of the target category and the other category (step S204). Then, the score calculating unit 20A registers the score calculated in step S204 in the score DB 16B in association with the pair of the corresponding product and the user (step S206). The relevance degree calculating unit 20B calculates the degree of relevance between the target category to be analyzed to which the data belongs and another category other than the target category on the basis of the score calculated for each pair of pieces of data and the evaluation index (step S208). The target graph generating unit 20C generates a target graph 34 in which the data belonging to the other category and the data belonging to the target category are represented by a graph structure in which the data belonging to the other category and the data belonging to the target category are linked according to the degree of relevance using the degree of relevance calculated in step S208 (step S210). The representation vector calculating unit 20D calculates a representation vector V of each of the plurality of pieces of data included in the target graph 34 using the target graph 34 generated in step S210 (step S212).

The recommendation data extracting unit 22E extracts recommendation data on the basis of the representation vector V calculated in step S212 (step S214).

The output control unit 22F outputs, to the UI unit 14, at least one of the information regarding the degree of relevance calculated in step S208, the target graph 34 generated in step S210, the representation vector V calculated in step S212, and the recommendation data extracted in step S214 (step S216). Then, this routine is ended.

As described above, the information processing apparatus 11 according to the present embodiment includes the processing unit 22. The processing unit 22 extracts, as recommendation data for each of the plurality of pieces of data, another data group having a similarity equal to or greater than a predetermined value with respect to each of the plurality of pieces of data represented by the representation vector V, on the basis of the similarity between the plurality of pieces of data represented by the representation vector V.

Therefore, in addition to the effects of the above embodiment, the information processing apparatus 11 of the present embodiment can provide the recommendation data for each piece of data included in the relational data 16A.

Next, an example of a hardware configuration of the information processing apparatus 10 and the information processing apparatus 11 according to the above-described embodiments will be described.

Figure 16:
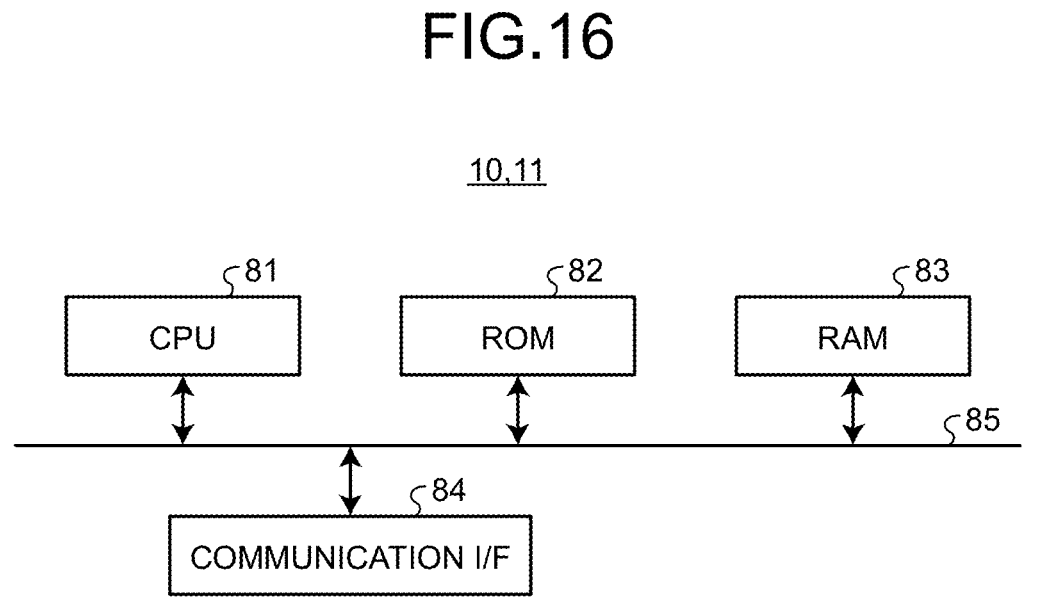

FIG. 16 is a hardware configuration diagram of an example of the information processing apparatus 10 and the information processing apparatus 11 according to the above embodiments.

The information processing apparatus 10 and the information processing apparatus 11 according to the above-described embodiments have a hardware configuration using a normal computer, in which a central processing unit (CPU) 81, a read only memory (ROM) 82, a random access memory (RAM) 83, a communication I/F 84, and the like are connected to each other via a bus 85.

The CPU 81 is an arithmetic device that controls the information processing apparatus 10 and the information processing apparatus 11 of the above embodiments. The ROM 82 stores programs and the like for implementing various processes by the CPU 81. Although the CPU is used in the description here, a graphics processing unit (GPU) may be used as an arithmetic device that controls the information processing apparatus 10 and the information processing apparatus 11. The RAM 83 stores data necessary for various processes by the CPU 81. The communication I/F 84 is an interface for transmitting and receiving data.

In the information processing apparatus 10 and the information processing apparatus 11 of the above embodiments, the CPU 81 reads the program from the ROM 82 onto the RAM 83 and executes the program, whereby the above functions are implemented on the computer.

Note that the program for executing each of the above-described processes executed by the information processing apparatus 10 and the information processing apparatus 11 according to the above-described embodiments may be stored in a hard disk drive (HDD). Furthermore, the program for executing each of the above-described processes executed by the information processing apparatus 10 and the information processing apparatus 11 of the above-described embodiments may be provided by being incorporated in the ROM 82 in advance.

Furthermore, the program for executing the above-described processes executed by the information processing apparatus 10 and the information processing apparatus 11 according to the above-described embodiments may be stored as a file in an installable format or an executable format in a computer-readable storage medium such as a CD-ROM, a CD-R, a memory card, a digital versatile disk (DVD), or a flexible disk (FD) and provided as a computer program product. Furthermore, the program for executing the above-described processes executed by the information processing apparatus 10 and the information processing apparatus 11 according to the above-described embodiments may be stored on a computer connected to a network such as the Internet and provided by being downloaded via the network. Furthermore, the program for executing the above-described processes executed by the information processing apparatus 10 to an information processing apparatus 10E of the above-described embodiment may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Note that the present technology can also have the following configurations.

Example 1. According to an embodiment, an information processing apparatus includes a hardware processor configured to function as a processing unit. The processing unit is configured to calculate, for each pair of pieces of data defined in a graph representing relational data indicating a relationship between a plurality of pieces of data in a graph structure, a degree of relevance between a target category to be analyzed and another category other than the target category on a basis of a score calculated according to a degree of relationship between a pair of pieces of data constituting the pair and an evaluation index for evaluating the degree of relevance between categories.

Example 2. In the information processing apparatus according to example 1, the processing unit generates the graph from the relational data for each pair of the target category and the another category on a one-to-one basis.

Example 3. In the information processing apparatus according to example 1, the graph is represented by the graph structure linked according to the relationship in which a plurality of pieces of data included in the relational data is represented by the relational data.

Example 4. In the information processing apparatus according to any one of examples 1 to 3, the processing unit generates the graph with an adjusted weight of a linkage between pieces of data.

Example 5. In the information processing apparatus according to any one of examples 1 to 4, the processing unit generates the graph with a weight of a linkage between pieces of data adjusted to a specified value.

Example 6. In the information processing apparatus according to any one of examples 1 to 5, the processing unit calculates, as the score, a number of paths for the each pair, the number of paths being a number of routes reaching from one data to another data, both constituting the pair with a predetermined number of hops or less.

Example 7. In the information processing apparatus according to any one of examples 1 to 6, the processing unit calculates, as the score, a weighted average value of a number of paths for the each pair, the number of paths being a number of routes reaching from one data to another data, both constituting the pair with a predetermined number of hops or less.

Example 8. In the information processing apparatus according to any one of examples 1 to 7, the processing unit calculates, as the score, a value represented by an inner product of a first matrix and a transposed matrix of the first matrix, the first matrix being obtained by multiplying an adjacent matrix of the graph by a predetermined matrix of dimensions according to a number of dimensions of data of the graph.

Example 9. In the information processing apparatus according to any one of examples 1 to 8, the processing unit calculates, as the degree of relevance, a value obtained by combining a plurality of the evaluation indexes.

Example 10. In the information processing apparatus according to any one of examples 1 to 9, the processing unit calculates, as the degree of relevance, a value of the evaluation index satisfying a preset constraint.

Example 11. In the information processing apparatus according to any one of examples 1 to 10, the processing unit calculates the degree of relevance on a basis of the evaluation index and the score calculated for each of some pairs sampled from a plurality of pairs.

Example 12. In the information processing apparatus according to any one of examples 1 to 11, the processing unit calculates the degree of relevance on a basis of the evaluation index for which an input is received.

Example 13. In the information processing apparatus according to any one of examples 1 to 12, the processing unit outputs the degree of relevance between the target category and the another category.

Example 14. In the information processing apparatus according to any one of examples 1 to 13, the processing unit specifies the another category similar to the target category using the degree of relevance, and generates a target graph in which data belonging to the specified another category and data belonging to the target category are linked according to the degree of relevance and which is represented in a graph structure.

Example 15. In the information processing apparatus according to example 14, the processing unit calculates a representation vector of each of a plurality of pieces of data included in the target graph using the target graph.

Example 16. In the information processing apparatus according to example 14 or 15, the processing unit calculates a representation vector of each piece of data included in the target graph so as to hold a graph structure of the target graph.

Example 17. In the information processing apparatus according to example 15 or 16, the processing unit extracts a tendency pattern of a plurality of pieces of data represented by the representation vector on a basis of a feature represented by the representation vector.

Example 18. In the information processing apparatus according to any one of examples 15 to 17, the processing unit extracts, as recommendation data for each of the plurality of pieces of data, another data group having a degree of similarity equal to or greater than a predetermined value with respect to each of a plurality of pieces of data represented by the representation vector on a basis of a degree of similarity of the plurality of pieces of data represented by the representation vector.

Example 19. According to an embodiment, an information processing method is executed by an information processing apparatus. The information processing method includes calculating, for each pair of pieces of data defined in a graph representing relational data indicating a relationship between a plurality of pieces of data in a graph structure, a degree of relevance between a target category to be analyzed and another category other than the target category on a basis of a score calculated according to a degree of relationship between a pair of pieces of data constituting the pair and an evaluation index for evaluating the degree of relevance between categories.

Example 20. According to an embodiment, an information processing computer program product has a non-transitory computer readable medium including programmed instructions stored thereon. When executed by a computer, the instructions cause the computer to execute calculating, for each pair of pieces of data defined in a graph representing relational data indicating a relationship between a plurality of pieces of data in a graph structure, a degree of relevance between a target category to be analyzed and another category other than the target category on a basis of a score calculated according to a degree of relationship between a pair of pieces of data constituting the pair and an evaluation index for evaluating the degree of relevance between categories.

What is claimed is:

1. An information processing apparatus comprising:
a hardware processor configured to:
    acquire relational data indicating relationships among a plurality of pieces of data, each piece of data being associated with a category;
    generate, from the relational data, a graph represented in a graph structure and defining pairs of pieces of data based on the relationships, the generating comprising, for each pair of a target category to be analyzed and an other category different from the target category, generating a corresponding graph that represents pieces of data belonging to the target category and the other category and relationships therebetween;
    calculate, for each pair of pieces of data defined in the corresponding graph, a score according to a degree of relationship between the pieces of data of the pair;
    register the score in a score database in association with the pair of pieces of data;
    calculate, based on (i) the score registered for pairs of pieces of data and (ii) an evaluation index for evaluating a degree of relevance between categories, a degree of relevance between the target category to be analyzed and the other category;
    generate a target graph by specifying, using the calculated degree of relevance, at least one specified other category having a degree of relevance satisfying a criterion, and linking data belonging to the specified other category and data belonging to the target category according to the degree of relevance to form the target graph represented in a graph structure;
    calculate, using the target graph, a representation vector for each of a plurality of pieces of data included in the target graph;
    extract, based on features represented by the representation vectors, a tendency pattern for the plurality of pieces of data; and
    control output to output at least one of (i) information indicating the degree of relevance, (ii) the target graph, (iii) the representation vectors, or (iv) information indicating the tendency pattern.

2. The information processing apparatus according to claim 1, wherein the hardware processor is configured to generate the graph from the relational data for each pair of the target category and the other category on a one-to-one basis.

3. The information processing apparatus according to claim 1, wherein the graph is represented by the graph structure linked according to the relationship in which a plurality of pieces of data included in the relational data is represented by the relational data.

4. The information processing apparatus according to claim 3, wherein the hardware processor is configured to generate the graph with an adjusted weight of a linkage between pieces of data.

5. The information processing apparatus according to claim 3, wherein the hardware processor is configured to generate the graph with a weight of a linkage between pieces of data adjusted to a specified value.

6. The information processing apparatus according to claim 1, wherein the hardware processor is configured to calculate, as the score, a number of paths for the each pair, the number of paths being a number of routes reaching from one data to another data, both constituting the pair with a predetermined number of hops or less.

7. The information processing apparatus according to claim 1, wherein the hardware processor is configured to calculate, as the score, a weighted average value of a number of paths for the each pair, the number of paths being a number of routes reaching from one data to another data, both constituting the pair with a predetermined number of hops or less.

8. The information processing apparatus according to claim 1, wherein the hardware processor is configured to calculate, as the score, a value represented by an inner product of a first matrix and a transposed matrix of the first matrix, the first matrix being obtained by multiplying an adjacent matrix of the graph by a predetermined matrix of dimensions according to a number of dimensions of data of the graph.

9. The information processing apparatus according to claim 1, wherein the hardware processor is configured to calculate, as the degree of relevance, a value obtained by combining a plurality of the evaluation indexes.

10. The information processing apparatus according to claim 1, wherein the hardware processor is configured to calculate, as the degree of relevance, a value of the evaluation index satisfying a preset constraint.

11. The information processing apparatus according to claim 1, wherein the hardware processor is configured to calculate the degree of relevance on a basis of the evaluation index and the score calculated for each of some pairs sampled from a plurality of pairs.

12. The information processing apparatus according to claim 1, wherein the hardware processor is configured to calculate the degree of relevance on a basis of the evaluation index for which an input is received.

13. The information processing apparatus according to claim 1, wherein the hardware processor is configured to output the degree of relevance between the target category and the another category.

14. The information processing apparatus according to claim 1, wherein the hardware processor is configured to specify the other category similar to the target category using the degree of relevance, and generate a target graph in which data belonging to the specified other category and data belonging to the target category are linked according to the degree of relevance and which is represented in a graph structure.

15. The information processing apparatus according to claim 14, wherein the hardware processor is configured to calculate a representation vector of each of a plurality of pieces of data included in the target graph using the target graph.

16. The information processing apparatus according to claim 15, wherein the hardware processor is configured to calculate a representation vector of each piece of data included in the target graph so as to hold a graph structure of the target graph.

17. The information processing apparatus according to claim 15, wherein the hardware processor is configured to extract a tendency pattern of a plurality of pieces of data represented by the representation vector on a basis of a feature represented by the representation vector.

18. The information processing apparatus according to claim 15, wherein the hardware processor is configured to extract, as recommendation data for each of the plurality of pieces of data, another data group having a degree of similarity equal to or greater than a predetermined value with respect to each of a plurality of pieces of data represented by the representation vector on a basis of a degree of similarity of the plurality of pieces of data represented by the representation vector.

19. An information processing method executed by an information processing apparatus, the method comprising:
acquiring relational data indicating relationships among a plurality of pieces of data, each piece of data being associated with a category;
generating, from the relational data, a graph represented in a graph structure and defining pairs of pieces of data based on the relationships, the generating comprising, for each pair of a target category to be analyzed and an other category different from the target category, generating a corresponding graph that represents pieces of data belonging to the target category and the other category and relationships therebetween;
calculating, for each pair of pieces of data defined in the corresponding graph, a score according to a degree of relationship between the pieces of data of the pair;
registering the score in a score database in association with the pair of pieces of data;
calculating, based on (i) the score registered for pairs of pieces of data and (ii) an evaluation index for evaluating a degree of relevance between categories, a degree of relevance between the target category to be analyzed and the other category;
generating a target graph by specifying, using the calculated degree of relevance, at least one specified other category having a degree of relevance satisfying a criterion, and linking data belonging to the specified other category and data belonging to the target category according to the degree of relevance to form the target graph represented in a graph structure;
calculating, using the target graph, a representation vector for each of a plurality of pieces of data included in the target graph;
extracting, based on features represented by the representation vectors, a tendency pattern for the plurality of pieces of data; and
controlling output to output at least one of (i) information indicating the degree of relevance, (ii) the target graph, (iii) the representation vectors, or (iv) information indicating the tendency pattern.

20. An information processing computer program product having a non-transitory computer readable medium including programmed instructions stored thereon, wherein the instructions, when executed by a computer, cause the computer to execute:
acquiring relational data indicating relationships among a plurality of pieces of data, each piece of data being associated with a category;
generating, from the relational data, a graph represented in a graph structure and defining pairs of pieces of data based on the relationships, the generating comprising, for each pair of a target category to be analyzed and an other category different from the target category, generating a corresponding graph that represents pieces of data belonging to the target category and the other category and relationships therebetween;

calculating, for each pair of pieces of data defined in the corresponding graph, a score according to a degree of relationship between the pieces of data of the pair;

registering the score in a score database in association with the pair of pieces of data;

calculating, based on (i) the score registered for pairs of pieces of data and (ii) an evaluation index for evaluating a degree of relevance between categories, a degree of relevance between the target category to be analyzed and the other category;

generating a target graph by specifying, using the calculated degree of relevance, at least one specified other category having a degree of relevance satisfying a criterion, and linking data belonging to the specified other category and data belonging to the target category according to the degree of relevance to form the target graph represented in a graph structure;

calculating, using the target graph, a representation vector for each of a plurality of pieces of data included in the target graph;

extracting, based on features represented by the representation vectors, a tendency pattern for the plurality of pieces of data; and controlling output to output at least one of (i) information indicating the degree of relevance, (ii) the target graph, (iii) the representation vectors, or (iv) information indicating the tendency pattern.

\* \* \* \* \*